S. F. BAUWENS.
WIRE BOUND BOX MACHINE.
APPLICATION FILED APR. 8, 1912. RENEWED FEB. 13, 1919.
1,313,854.
Patented Aug. 19, 1919.
5 SHEETS—SHEET 5.
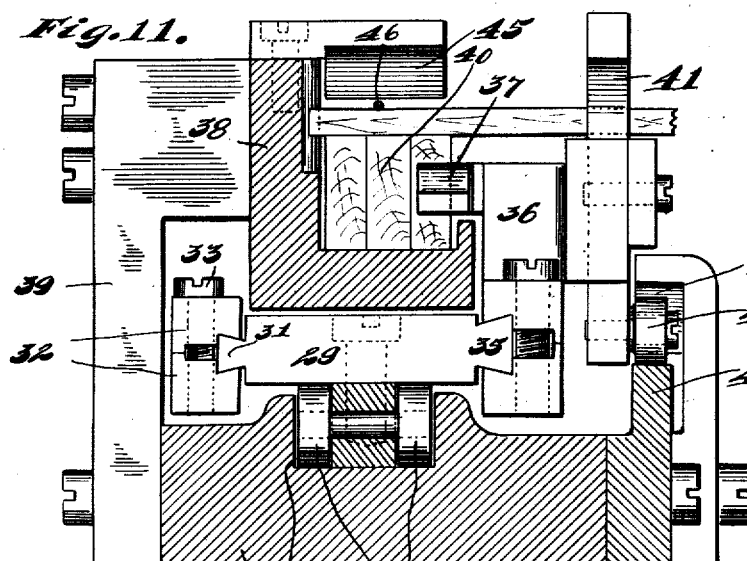
Fig. 11.
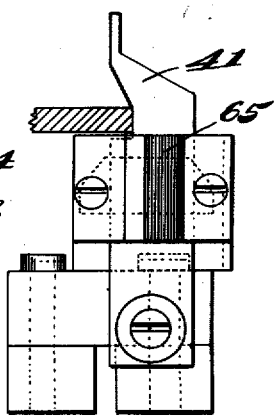
Fig. 13.
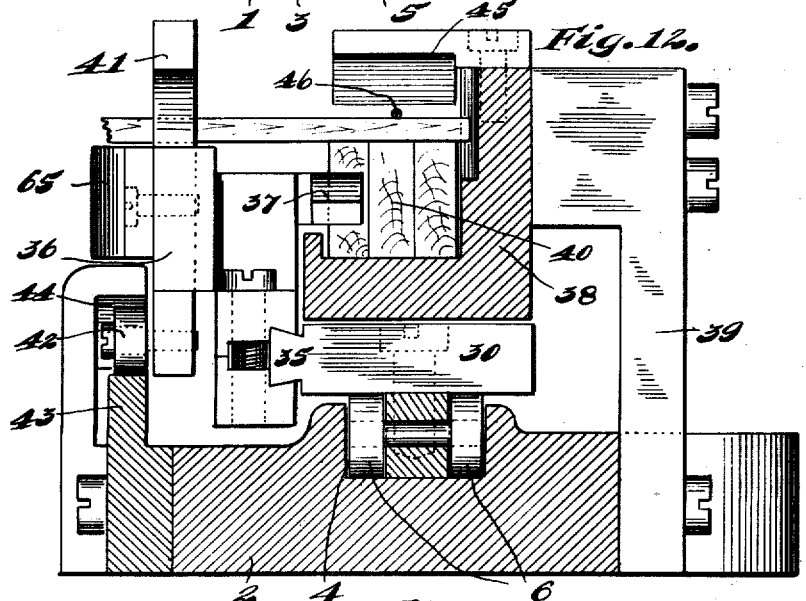
Fig. 12.
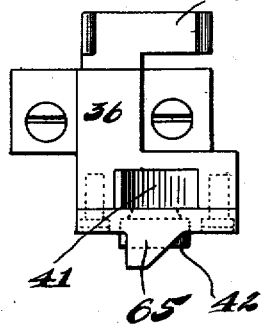
Fig. 14.
Fig. 10.
Witnesses:
C. E. Wessels
B. G. Richards
Inventor:
Seraphine F. Bauwens,
By Joshua R. H. Potts
his Attorney.

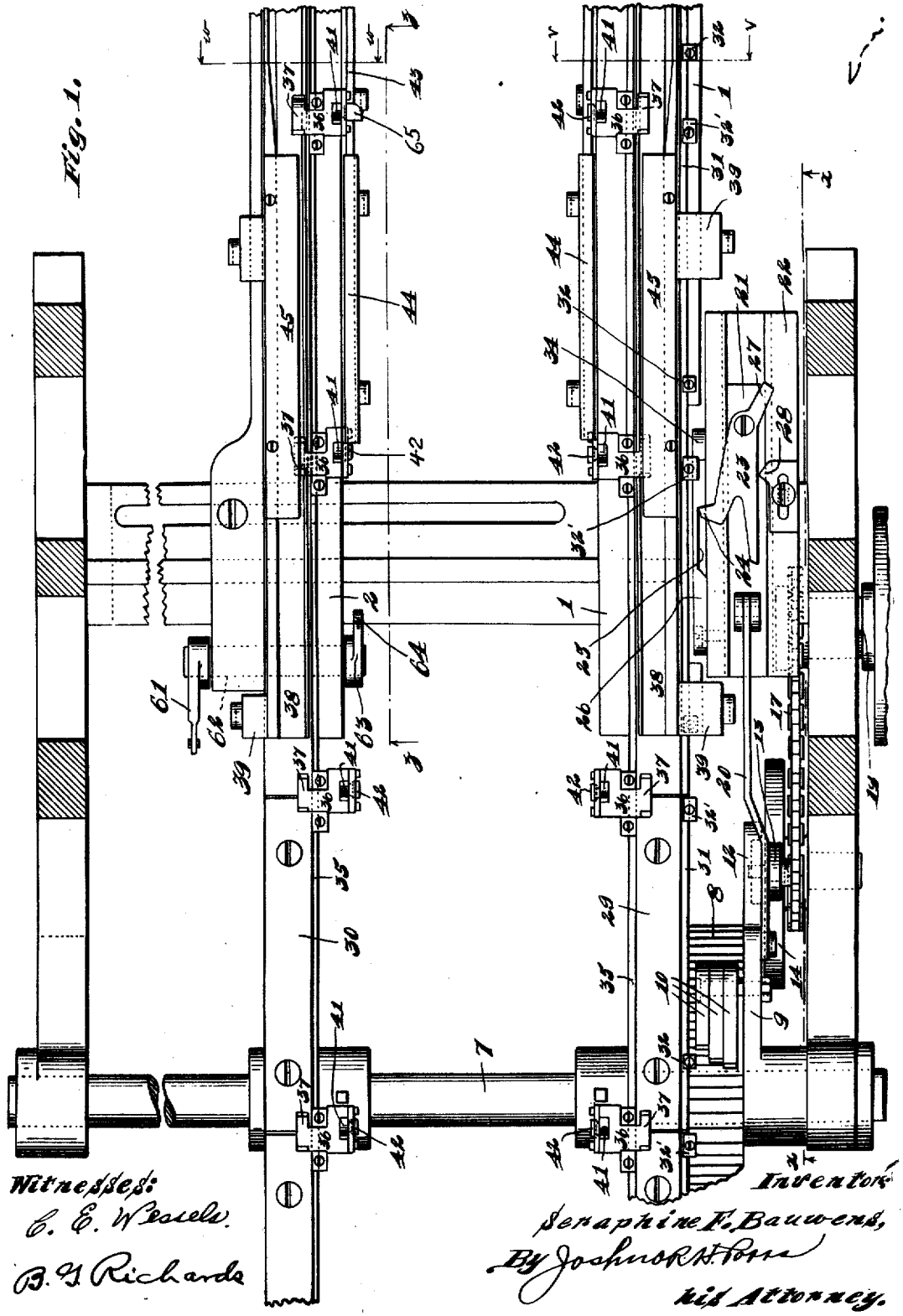

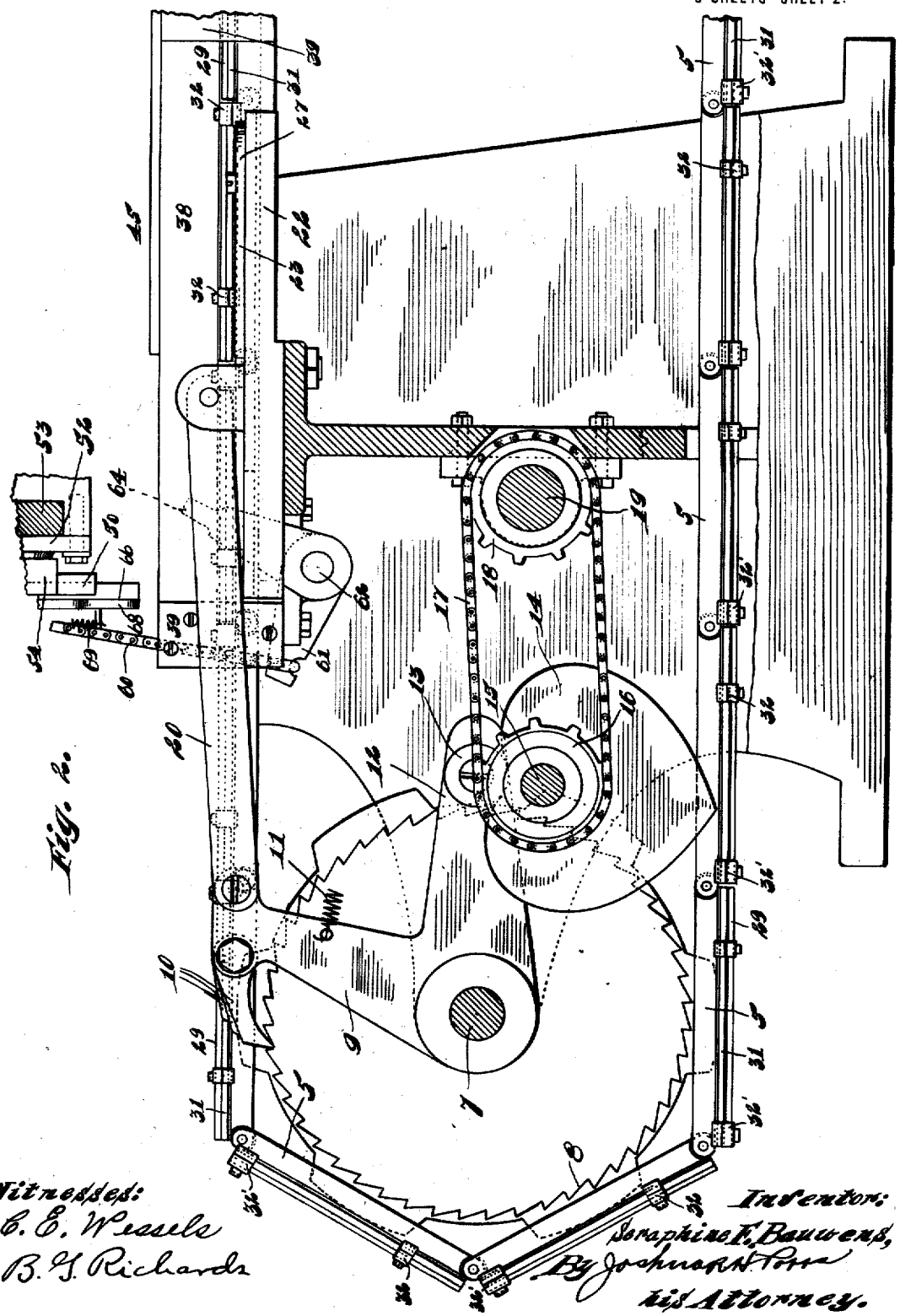

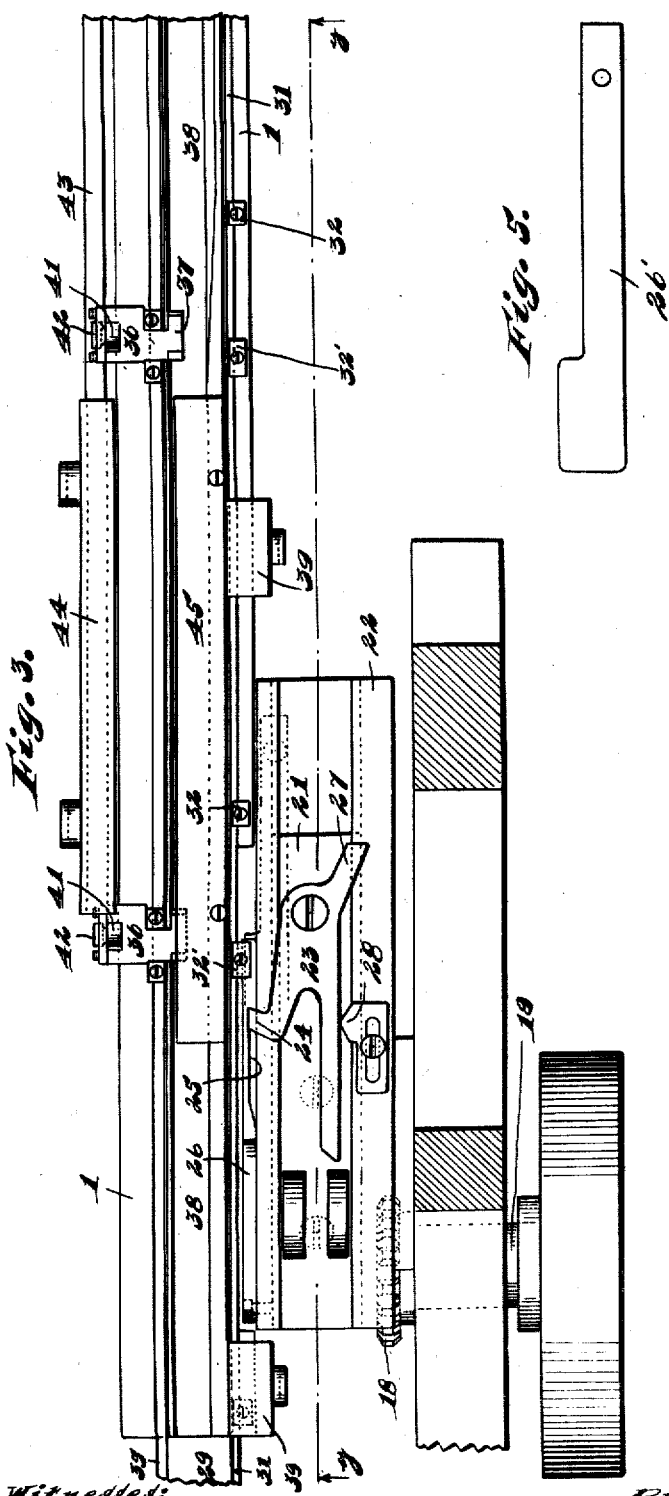
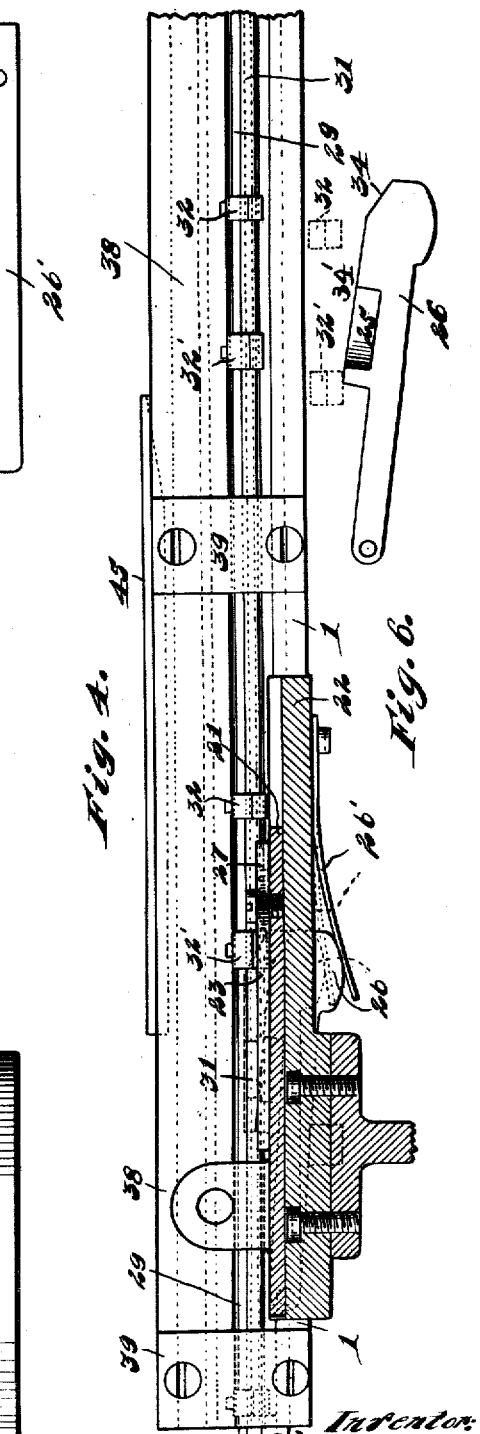

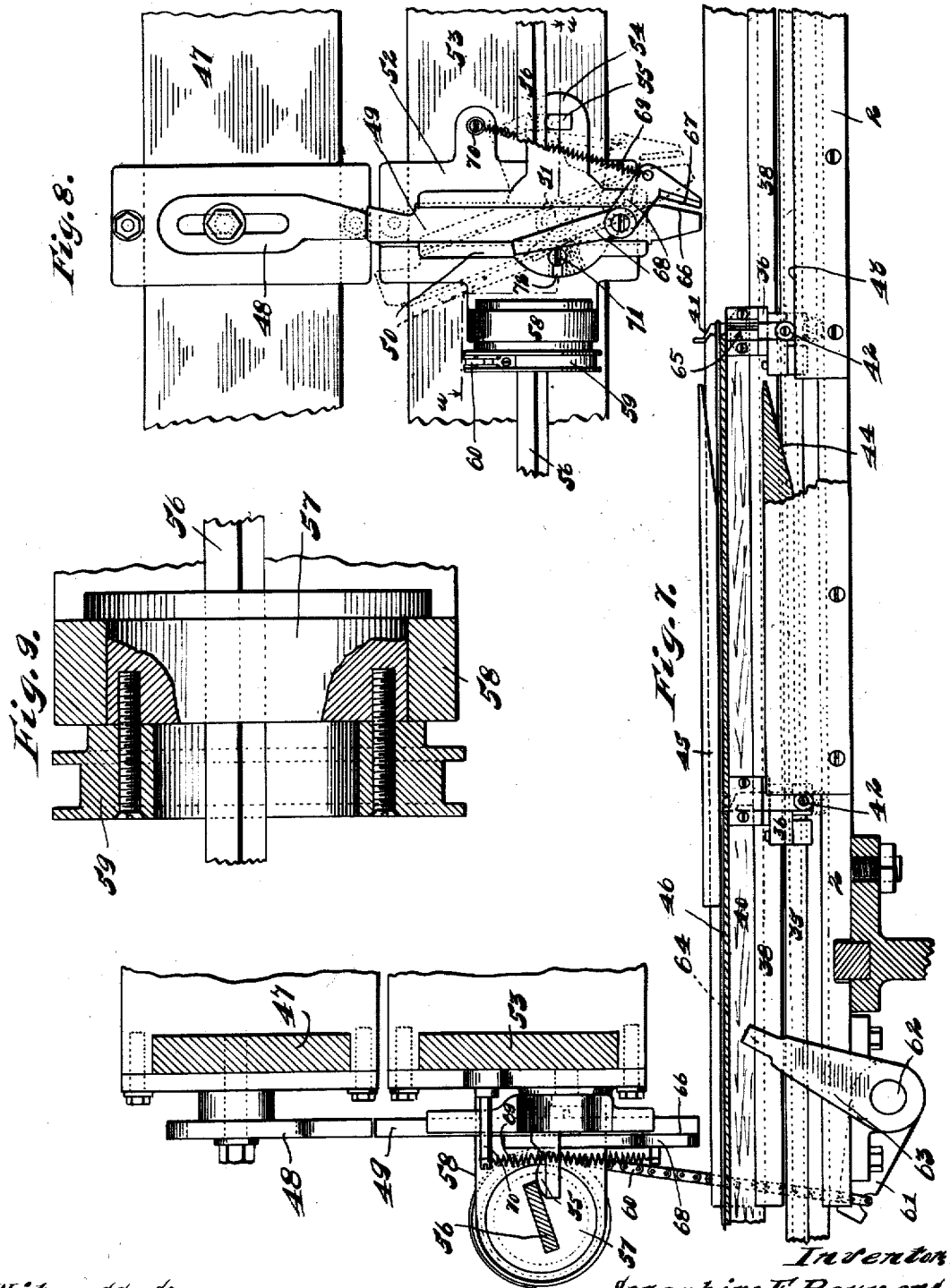

UNITED STATES PATENT OFFICE.

SERAPHINE F. BAUWENS, OF CHICAGO, ILLINOIS, ASSIGNOR, BY MESNE ASSIGNMENTS, TO WIREBOUNDS PATENTS COMPANY, OF KITTERY, MAINE, A CORPORATION OF MAINE.

WIRE-BOUND-BOX MACHINE.

1,313,854.  Specification of Letters Patent.  Patented Aug. 19, 1919.

Application filed April 8, 1912, Serial No. 689,197. Renewed February 13, 1919. Serial No. 276,860.

*To all whom it may concern:*

Be it known that I, SERAPHINE F. BAUWENS, a citizen of the United States, and a resident of the city of Chicago, county of Cook, and State of Illinois, have invented certain new and useful Improvements in Wire-Bound-Box Machines, of which the following is a specification.

My invention relates to improvements in wire bound box machines, and has for its object the provision of a machine of this character provided with improved means for controlling the locations of the staples employed in securing the box together, and improved means for cutting off the wires employed in such boxes.

The invention consists in the combinations and arrangements of parts hereinafter described and claimed.

The invention will be best understood by reference to the accompanying drawings forming a part of this specification, and in which—

Figure 1 is a partial top plan view of the discharge end of a wire bound box machine embodying my invention, Fig. 2, a longitudinal section of the machine, Fig. 3, an enlarged top plan view of means employed in the machine for regulating the feed of the box sides therethrough, Fig. 4, a section of the machine taken on line *y—y* of Fig. 3, Fig. 5, a plan view of a spring employed in said regulating means, Fig. 6, a detail elevation of a stop plate employed in said means, Fig. 7, a section taken on substantially line *z—z* of Fig. 1, Fig. 8, an elevation of wire cutting mechanism employed in the machine, Fig. 9, an enlarged sectional detail showing the means for mounting an oscillatory bar employed in the machine, Fig. 10, a detail section taken on line *u—u* of Fig. 8, Fig. 11, an enlarged section taken on line *v—v* of Fig. 1, Fig. 12, an enlarged section taken on line *w—w* of Fig. 1, Fig. 13, a side elevation of one of the feed blocks employed in the machine, and Fig. 14, a top plan view corresponding to Fig. 13.

The machine selected for illustration is of the type employed in making foldable box blanks of a well known construction, by wiring together in coöperative foldable relationship cleats and sheets of side material for a plurality of box sides or sections, for instance the sides and bottom or the sides, top and bottom of a wirebound box. In machines of this class, successively assembled box sections, in proper relationship to each other, are progressively subjected to the action of a gang of binding wire applying and stapling mechanisms for attaching the binding wires and securing the sheets and cleats together at successive points on the work, the outer binding wires alined with the cleats being usually fastened through the sheets to the cleats. In the illustrative machine the work is fed step-by-step beneath the staplers, which operate in alternation with the feed as well understood in the art. The cleats travel in channel guides having flanges for guiding the sheets laid upon the cleats, and the work is advanced to the staplers with the parts of adjacent sections of a blank in proper spacial relationship as determined by the cleat and sheet pushing devices. These sheet and cleat pushing devices are carried by feed blocks attached to a pair of endless conveyer chains running along the cleat guides, there being a group of such blocks for every blank.

The preferred form of construction, as illustrated in the drawings, comprises a suitable frame provided with side rails 1 and 2, said side rails being provided with guide recesses 3 and 4, respectively, adapted to receive feed sprocket chains 5 and 6 employed in the machine. A horizontal drive shaft 7 is also mounted in the machine and is provided with suitable sprocket wheels for chains 5 and 6. Side rail 1 is fixed in the frame of the machine and side rail 2 and its chain 6 are made laterally adjustable, as is usual in such machines, to accommodate assembled blank materials for different sizes of boxes, as will be readily understood by those skilled in the art.

A ratchet wheel 8 is fixed to shaft 7 and a pawl arm 9 is loosely mounted on said shaft. Pawl arm 9 carries three pawls 10, arranged, as shown, to eliminate lost motion as far as possible and adapted to cooperate with ratchet 8 to rotate shaft 7 upon reciprocation of said pawl arm. Pawl arm 9 is connected with a spring 11 which is suitably anchored at its other end to the frame of the machine and serves to hold said pawl arm in its retracted or inoperative position. Pawl arm 9 also carries a lever arm 12 provided with a roller 13 coöperating with a heart-shaped cam 14 which is fixed to a shaft 15. Shaft 15 carries a sprocket wheel 16 which is connected by means of a sprocket chain 17 with a sprocket wheel 18 on the main drive shaft 19 of the machine. By this arrangement, it will be observed, that upon rotation of shaft 19, pawl arm 9 and consequently pawls 10 will be caused to oscillate to effect intermittent rotation of ratchet wheel 8 and consequently shaft 7. As explained above, shaft 7 is arranged to drive chains 5 and 6 through channels 3 and 4, so that such oscillations of pawl arm 9 and pawls 10 will cause intermittent movement of said chains through their channels.

Pawl arm 9 is connected by a link 20 with a reciprocatory block 21 mounted in a suitable guide member 22 secured to the frame of the machine. A pawl 23 is pivotally mounted on block 21 and is provided with a nose 24 arranged to engage a recess 25 provided in a vertically swinging stop plate 26 pivoted to the side of guide member 22, as shown. A spring 26' is secured to the bottom of guide member 22 and contacts with the bottom of plate 26 and serves to hold said plate normally in a horizontally disposed position with recess 25 in position to receive pawl nose 24. Pawl 23 is provided with an inclined arm 27 arranged to contact with a cam stop 28 adjustably secured to guide member 22, as shown. By this arrangement, it will be observed, that upon forward movement of block 21, arm 27 on pawl 23 will contact with cam stop 28 and throw pawl nose 24 out of engagement with recess 25, and that, upon rearward movement of block 21, pawl nose 24 will be forced into recess 25, and that shoulder at the rear end of said recess will limit the rearward movement of said pawl nose and consequently the rearward movement of block 21.

Elongated plates 29 and 30 are secured to each of the links of chains 5 and 6, and each of the plates 29 is provided at its outer side with a dovetail rib 31, as shown in Fig. 11. Split stop blocks 32 and 32' are adjustably secured on ribs 31 by means of clamping screws 33, as shown, the block 32' being somewhat longer than the block 32, as indicated in Figs. 1 and 6, for a purpose to be hereinafter mentioned. The rear upper corner 34 of stop plate 26 is beveled, as shown, and an elevated land 34' is provided on said stop plate just forward of said corner. By this arrangement, it will be observed that, as feed chain 5 is fed through the machine, stop 32' will be brought in contact with beveled corner 34 on stop plate 26 and depress the same so as to prevent entry of the pawl nose 24 into recess 25, and will hold said stop plate 26 depressed until stop 32 passes onto said land 34', as indicated in dotted lines in Fig. 6. This will throw stop plate 26 out of commission as a means for limiting the movement of block 21, and will substitute blocks 32 and 32' therefor. In a machine of this character the distance between the staples applied to the boxes is controlled by the feed of the work to the stapling mechanism, as is well known by those skilled in the art. By the arrangement above set forth, the feed of the chain is controlled in the first instance by means of stop plate 26 and recess 25 which serve to limit the rearward movement of block 21 and consequently the inoperative movement of pawls 10 and of roller 13 with respect to cam 14. But limitation of the inoperative movement of roller 13 correspondingly limits the extent of feed of the feed chains, inasmuch as such limitation of roller 13 causes lost motion between itself and cam 14 and thus lessens the operative movement of said roller proportionately. This being so, it will be seen that limitation of the rearward movement of block 21 controls the forward movement of the feed chains and consequently the distance apart in the work of the staples applied by the machine. Stop plate 26 is designed for use where ordinary stapling at uniform distances apart is desired, such, for instance, as in the body of the box sides. However, the staples at the edges of the box sides are usually differently spaced and stops 32 and 32' are provided to vary the staple spacing at these points. As explained above, when stop 32' contacts with plate 26, said plate is thrown out of commission and said stop is substituted therefor. Thus stop 32' will control the location of the first of these irregularly spaced staples and stop 32 will control the location of the second. Inasmuch as stops 32 and 32' are adjustable on chain 5, it will be observed that the location of these irregular staples may be controlled as desired, by adjusting said stops. In the manufacture of crates, it is often desirable to employ a system of stapling in which practically none of the staples are located at uniform distances apart. Such a contingency may be readily met by supplying a sufficient number of adjustable stops 32 and 32' and properly adjusting the same on chain 5. As explained above, the stapling can thus be varied practically as desired within the limits of the machine.

Each of the plates 29 and 30 carries a dovetail rib 35 at its inner side to which feed blocks 36 may be adjustably secured. Each of the feed blocks 36 carries an outwardly extending feed finger 37 projecting into a channel member 38 secured to the corresponding side rail of the machine by means of a suitable standard 39. Feed fingers 37 are arranged on the respective chains in transverse alinement with each other and serve to feed cleats 40 through channel members 38, said fingers spacing the cleats of adjacent box blank sections one from another. Vertically movable positioning members 41 are also mounted in feed blocks 36 and carry rollers 42 coöperating with tracks 43 and cam members 44 to properly position sheets or sections of material for box sides on said cleats. Cover plates 45 are also arranged over the channels in members 38 to vertically position box sides on said cleats. The means for feeding the cleats through channel members 38 and the means for positioning the box sides thereon constitute the subject matter of my Patent No. 1,142,008, dated June 8, 1915, filed of even date herewith and need no further description here, being fully set forth in said companion application.

As stated before, the feed blocks referred to are arranged on the conveyer chains in groups for a succession of blanks, the number of blocks of a group depending upon the number of sections or box sides per blank; for example, the four pairs of feed blocks shown in Fig. 1 may be employed for relatively positioning a three-section blank, or for pushing ahead in proper relative position to each other the several sections of a four-section blank to form the top, sides and bottom of a box. By properly positioning the blocks of successive groups, proper spaces may be provided between the blanks for cutting the binding wires therebetween and leaving projecting wire ends on each blank after the blanks are cut apart.

My improvements in wire cutting means are designed for use in conjunction with any ordinary wire applying and stapling mechanism adapted to apply the usual wires 46 to the box sides and cleats in the usual manner. The wire cutting mechanism is illustrated as being applied in conjunction with stapling mechanism employing a vertically reciprocating member 47 which reciprocates at each application of a row of staples to the box sides. To the outside of this member 47 is secured a hammer member 48 adapted to engage a slidable cutter block 49 which is mounted in an oscillatory guide head 50. Guide head 50 is mounted to oscillate on a journal 51 secured in a block 52 which is in turn attached to a beam 53 suitably supported from the frame of the machine. Guide head 50 carries a laterally extending arm 54 provided with a projecting stud 55 which rests under an oscillatory bar 56. Bar 56 passes through a spindle 57 in a bracket 58 formed integrally with block 52. A grooved sheave member 59 is secured to spindle 57, as indicated in Fig. 9, and a sprocket chain 60 has its upper end secured in said groove and wound on said sheave. The lower end of sprocket chain 60 is secured to a crank arm 61 fixed to a shaft 62 which carries a rocker arm 63 at its inner end. The upper end of rocker arm 63 is provided with an engaging finger 64 set in the path of stops 65 one of which is secured to every fourth feed block 36 on chain 6, assuming that there are four such blocks for a blank; that is to say the stops 65 are secured respectively to corresponding feed blocks of successive groups. By this arrangement, it will be observed, that as each of the stops 65 passes rocker arm 63, crank arm 61 will be rocked to draw chain 60 downwardly and rotate spindle 57 to rock bar 56. This rocking of bar 56 causes depression of laterally extending arm 54 and consequently rocking of guide head 50, from the dotted line position indicated in Fig. 8 to the full line position so as to bring the cutter into operative position. Thus by attaching a stop 65 to every fourth one of the blocks 36 on chain 6, guide head 50 will be placed in position to permit hammer 48 to depress cutter block 49; in other words a relationship is established between the cutting means and actuating bar 47 of the stapling apparatus for actuation of the cutter thereby. Blocks 65 are so placed on chain 6 as to cause this movement to occur at the completion at each set of box sides, as will be readily understood by those skilled in the art. For example, the stops 65 may be secured each to the rear feed block for a blank, which of course is set sufficiently ahead of the foremost edge of the following blank to provide the desired space for cutting between the blanks.

At its lower end cutter block 49 is provided with a shearing edge 66 adapted to coöperate with shearing edge 67 on the lower end of a bell crank lever 68 which is pivoted to block 49, as shown in Fig. 8. A spring 69 is secured at its lower end to the lower arm of bell crank 68 and at its upper end to a stud 70, as shown. A stud bolt 71 is adjustably secured in a T-slot 72 in position to contact with the outer side of the upper arm of bell crank 68 so as to cause operation of shearing edge 67 upon depression of block 49. One of these cutting mechanisms and a corresponding hammer block 48 is provided for each of the wires applied to the box sides and is arranged just over the path of travel of the corresponding wire. Individual binding wire cutters are thus provided, comprising coöperating shearing blades normally withheld from the plane of the work and adapted to enter the space between the blanks and to close upon and cut the wires. These cutters are adapted to enter between the cleats of successive blanks and cut the wires secured to said cleats while the work is supported in the channel cleat guides shown in Fig. 11, whereas such wires could not otherwise be severed until after movement of the work to a position beyond the work support. Upon depression of the corresponding block 49, each of the wires will be severed by the shearing action of shearing edges 66 and 67. Upon passage of block 65 past rocker arm 63, spring 69 serves to return the parts to normal inoperative positions.

It will be seen that the stops 65 exemplify cutter-controlling members similarly related respectively with successive blanks or pieces of work to be severed, and which are successively brought into play by the relative movement or progression between the work and binding wire securing or stapling mechanism; and said controlling members in the illustrative machine being attached, for instance, to the rear feed blocks of the blanks, and hence having their positions relative to each other determined by the locations of said feed blocks, the latter being positioned according to the sizes and desired spacing of the blanks. The cutting mechanism is accordingly controlled by said members 65 through the agency of the rocker arm or controller 63 which always operates to place the cutting mechanism in condition for action when the work is brought to a desired relationship to the cutter, i. e. to a position for cutting between successive pieces of work. Hence, regardless of the length of the box blanks and irregularities in the feeding movements of the work, the cutting mechanism will be brought into action at suitable times to sever the wires between the blanks or pieces of work, since the operation is controlled by the change of relationship of parts in bringing the work to position for cutting. Thus it will be observed that the wires of the box sides may be automatically severed and that the time of severing may be adjusted for different sizes of boxes by adjusting the corresponding feed blocks 36 as required.

From the foregoing description of the illustrative machine of the drawings, it will be seen that the mechanism which produces relative progression between the work and the stapling apparatus, or which in this instance advances the work in alternation with the stapling operations, has capacity for a regulable variability of motion-communicating action within a certain maximum, during successive cycles of the main shaft, so that the extents or intervals of progression between consecutive stapling operations may be caused to consume different fractions of the cycle of the main shaft; and further that extents or intervals of progression between stapling operations are controllable to locate individual staples at desired points on box parts by regulating said mechanism, and consequently the progressive movements imparted thereby, from controlling members as 32, 33', etc., located with reference to said desired stapling points and successively brought into play by the relative progression, or in this instance by the travel of the work-forwarding conveyer chains. Regulation of the said mechanism is however normally assumed by a means, herein exemplified by the displaceable stop plate 26, which regularly controls successive intervals of progression for determining the normal spacing between adjacent staples, thus relieving the work-forwarding means or conveyer chains from the function of progression control for ordinary purposes; while the said normal controlling means is automatically superseded in action, at the proper times, by the aforesaid controlling members 32, 33' etc., to locate the particular staples which are desired to be definitely positioned in relation to the work, or at a definite distance from the edges of box sections, these being usually the staples adjacent the edges.

In the specific form illustrated, the mechanism referred to has provision for lost motion, in this instance between the cyclically moving actuating cam 14 and reciprocable pawl-carrying driver 9 of the illustrative pawl and ratchet feeding mechanism, whereby the effective action of said driver 9 and consequently the coaction of the pawls 110 with the ratchet wheel 8 are determined by the normal and supplemental controlling means hereinbefore described.

The circulating conveyer-chains, having properly positioned spacing devices, with their associated work-supporting and guiding means, provide for delivering to the staplers successively assembled box sections and blanks indefinitely, in proper relationship for wiring and for cutting the blanks apart.

While I have illustrated and described the preferred form of construction for carrying my invention into effect, this is capable of variation and modification without departing from the spirit of the invention. I, therefore, do not wish to be limited to the exact details of construction set forth, but desire to avail myself of such variations and modifications as come within the scope of the appended claims.

As will be evident to those skilled in the art, a machine embodying features of invention hereinbefore described will be susceptible of operation at comparatively high speed, will require little attendance by operators and will be capable of uninterrupted high speed production of wire-bound box blanks or parts having the wires secured thereto by fastenings of which such ones as are desired may be definitely positioned at predetermined points on the blanks or sections thereof. Preferred embodiments of the invention will be capable of operating through an indefinite succession of cycles at high speed while any desired positioning of individual staples or the like on successive blanks or on individual box sections may be effected automatically without attention from the operator and without interrupting the continuity of the production of an indefinite succession of assembled box-sections.

Having described my invention, what I claim as new and desire to secure by Letters Patent, is:

1. The combination in a box machine, of an endless feeding conveyer for feeding wire bound box sides therethrough; cutting means for the wires on said box sides; and means on said conveyer arranged to automatically control the operation of said cutting means, substantially as described.

2. The combination in a box machine, of a conveyer for feeding wire bound box sides therethrough; cutting means for the wires on said box sides; and adjustable means on said conveyer arranged to automatically control the operation of said cutting means, substantially as described.

3. The combination in a box machine, of a conveyer for feeding wire bound box sides therethrough; a reciprocating member; wire cutting means arranged to be operated by said member; means for operatively connecting said member and said cutting means; and means on said feeding conveyer for automatically throwing said connecting means into operation, substantially as described.

4. The combination in a box machine, of a conveyer for feeding wire bound box sides therethrough; a reciprocating member; wire cutting means arranged to be operated by said member; means for operatively connecting said member and said cutting means; and adjustable means on said feeding conveyer for automatically throwing said connecting means into operation, substantially as described.

5. The combination in a box machine, of a conveyer for feeding wire bound box sides therethrough; a reciprocating member; reciprocating cutting means arranged to be operated by said member; means for operatively connecting said member and said cutting means; and means on said feeding conveyer for automatically throwing said connecting means into operation, substantially as described.

6. The combination in a box machine, of a conveyer for feeding wire bound box sides therethrough; a reciprocating member; reciprocating cutting means arranged to be operated by said member; means for operatively connecting said member and said cutting means; and adjustable means on said feeding conveyer for automatically throwing said connecting means into operation, substantially as described.

7. The combination in a box machine, of two parallel sprocket chains arranged to feed wire bound box sides therethrough; a vertically reciprocating member; vertically reciprocating wire cutting means; means for operatively connecting said member and said cutting means; and stops on one of said chains arranged to throw said connecting means into and out of operation, substantially as described.

8. The combination in a box machine, of two parallel sprocket chains arranged to feed wire bound box sides therethrough; a vertically reciprocating member; vertically reciprocating wire cutting means; means for operatively connecting said member and said cutting means; and adjustable stops on one of said chains arranged to throw said connecting means into and out of operation, substantially as described.

9. In a machine for making wirebound boxes stapling mechanism and binding wire applying mechanism, blank material feeding means arranged to deliver, without stopping the operation of the machine, a succession of blanks to said mechanism, means for spacing successive blanks, and wire severing means periodically actuated in accordance with the passage of said spaces to sever the attached wires between blanks at such spaces.

10. In a machine for making wirebound boxes by the action of a stapling and binding wire applying mechanism on blank material, blank material feeding means arranged to deliver to said mechanism, without stopping the operation of the machine, a succession of blanks with spaces therebetween, wire severing means, and means rendered effective on the passage of a determined length of material for operating said severing means to sever the attached wires between blanks.

11. A machine for use in making wirebound boxes comprising, in combination, means for securing binding wire to box parts; means for relatively moving the wire-securing means and spaced assemblies of box parts; and means controlled in accordance with presentation of a space between such assemblies for cutting the binding wire in such space, including a plurality of pivoted shear blades for individual wires normally held off from the plane of the work and adapted to move into said space and close over and cut the wires.

12. A machine of the class described comprising, in combination, means to secure binding wire to box parts; means to cause relative progression between spaced assemblies of box parts and the wire-securing means; and means controlled in accordance with said progression for cutting the wire in a space between assemblies, comprising a plurality of coöperating shear blades for individual wires normally held off from the plane of the work and adapted to move into said space into cutting relationship with the respective wires, and means for operating said cutters in such space.

13. A machine for use in making wire-bound boxes comprising, in combination, means to secure binding wire to box parts; means to cause relative progression between the work and said wire securing means; automatically operated means for cutting said binding wire; said elements constructed and arranged to provide a continuously operating machine for wiring successive pieces of work and severing the binding wire between such pieces of work; and automatic means to determine a desired relationship between the cutting means and each of a succession of pieces of work at the time of the respective cutting operations.

14. In a machine of the class described, wire severing means including a plunger having a shear blade, a coöperating pivoted shear blade, means to operate said pivoted blade on reciprocation of said plunger, and means to reciprocate said plunger intermittently during the operation of the machine.

15. In a machine of the class described, a reciprocating cross head, wire severing means including a plunger having a shear blade, a coöperating pivoted shear blade, means to operate said pivoted blade on reciprocation of the plunger, and means to intermittently bring during the operation of the machine said plunger and cross head into coöperating relationship.

16. In a machine of the class described, a regularly reciprocating cross head, wire severing devices pivoted above the work, and means intermittently during the operation of the machine to swing them on their pivot to present them to the wire to be severed and to bring a part into coöperating relationship to said cross head to permit them to be operated thereby.

17. In a machine of the class described comprising coöperating stapling mechanism, work feeding mechanism and binding wire supply mechanism, binding wire cutting means comprising a member suspended above the applied wire and having a shear blade, a second member pivoted thereto and having a coöperating blade, means to lower said first member toward the wire and coöperating means to swing said second member.

18. In a machine of the class described comprising coöperating stapling mechanism, work feeding mechanism and binding wire supply mechanism, binding wire cutting means comprising a member suspended above the applied wire and having a shear blade, a second member pivoted thereto and having a coöperating blade, means to lower said first member toward the wire and coöperating means adapted to wipe longitudinally along said second member to swing the same.

19. Feeding mechanism for wire box machines comprising a ratchet wheel; a pawl arm and pawl arranged to operate said wheel intermittently; means for operating said arm; a slidable block connected to reciprocate with said arm; a pawl on said block; a movable stop member arranged to limit the inoperative movement of said block; a work feeding member; and a stop member on said work feeding member arranged to move said first mentioned stop member into inoperative position and serve as a stop for said block, substantially as described.

20. Feeding mechanism for wire box machines comprising a ratchet wheel; a pawl arm and pawl arranged to operate said wheel intermittently; means for operating said arm; a slidable block connected to reciprocate with said arm; a pawl on said block: a movable stop member arranged to limit the inoperative movement of said block; a work feeding member; and an adjustable stop member on said work feeding member arranged to move said first mentioned stop member into inoperative position and serve as a stop for said block, substantially as described.

21. Feeding mechanism for wire box machines comprising a ratchet wheel; a pawl arm and pawl arranged to operate said wheel intermittently; means for operating said arm; a slidable block connected to reciprocate with said arm; a pawl on said block; a downwardly swinging spring held stop plate provided with means arranged to limit the inoperative movement of said block; a work feeding member; and a stop member on said work feeding member arranged to move said first mentioned stop plate into inoperative position and serve as a stop for said block, substantially as described.

22. Feeding mechanism for wire box machines comprising a ratchet wheel; a pawl arm and pawl arranged to operate said wheel intermittently; means for operating said arm; a slidable block connected to reciprocate with said arm; a pawl on said block; a downwardly swinging spring held stop plate provided with means arranged to limit the inoperative movement of said block; a work feeding member; and an adjustable stop member on said work feeding member arranged to move said first mentioned stop plate into inoperative position and serve as a stop for said block, substantially as described.

23. Feeding mechanism for wire box machines comprising a ratchet wheel connected to operate the machine; a pawl arm and pawl arranged to operate said wheel intermittently; a cam arranged to force said arm through its operative stroke; a spring arranged to move said arm through its inoperative stroke; a reciprocatory block connected to be reciprocated by said arm; a limiting pawl on said block; a downwardly swinging spring held stop plate provided with a recess arranged to receive said pawl and limit its inoperative movement; a work feeding chain operatively connected with said ratchet wheel; and a plurality of stops on said chain arranged to depress said stop plate to inoperative position and to serve as stops for said limiting pawl, substantially as described.

24. Feeding mechanism for wire box machines comprising a ratchet wheel connected to operate the machine; a pawl arm and pawl arranged to operate said wheel intermittently; a cam arranged to force said arm through its operative stroke; a spring arranged to move said arm through its inoperative stroke; a reciprocatory block connected to be reciprocated by said arm; a limiting pawl on said block; a downwardly swinging spring held stop plate provided with a recess arranged to receive said pawl and limit its inoperative movement; a work feeding chain operatively connected with said ratchet wheel; and a plurality of adjustable stops on said chain arranged to depress said stop plate to inoperative position and to serve as stops for said limiting pawl, substantially as described.

25. A machine of the class described comprising a conveyer; a moving driving member; a mechanism adapted to detachably connect the driving member to the conveyer to drive the conveyer in a given direction; a movable stop member arranged to limit the inoperative movement of said driving member; a work feeding member; and a stop member on said work feeding member arranged to move said first mentioned stop member into inoperative position and serve as a stop for said driving member, substantially as described.

26. In a machine of the class described, the combination of a carriage for receiving blank sections; means to introduce binding material to said sections; means to secure said material to said sections at intervals; and carriage controlled detector means constructed and arranged to prevent the application of securing means at joints between said sections.

27. A machine of the class described comprising a work holder, a stapling mechanism, means to cause relative step by step movement therebetween including a fixed throw actuator, a device for normally reducing the amount of motion of said actuator and means automatically to render said device inoperative at controllably chosen times.

28. A machine for making wirebound boxes by the action of coöperating stapling and binding wire supplying means on box blank materials comprising feeding means for the materials, a driver for said feeding means, means normally to abridge the effective action of said driver, and means automatically to render said means inoperative at controllably chosen times.

29. A machine for making wirebound boxes by the action of coöperating stapling and binding wire supplying means on box blank materials comprising feeding means for the materials, a driver for said feeding means, means normally to abridge the effective action of said driver, and trips arranged for successive presentation in correlation with the feeding movement of the materials automatically to render said means inoperative.

30. A machine for making wirebound boxes by the action of coöperating stapling and binding wire supplying means on box blank materials comprising feeding means for the materials, a driver for said feeding means, means normally to abridge the effective action of said driver, and means governed in accordance with the position of the materials relative to the stapling mechanism to render said means inoperative.

31. A machine for making wirebound boxes by the action of coöperating stapling and binding wire supplying means on box blank material comprising feeding means for the materials including an actuator and a driver for said feeding means arranged for relative lost motion, a device normally controlling the amount of said lost motion and means to throw said device out of operation as the joints between blank sections are presented to the stapling mechanism.

32. A machine for making wirebound boxes by the action of coöperating stapling and binding wire supplying means on box blank material comprising feeding means for the materials including an actuator and a driver for said feeding means arranged for relative lost motion, a device normally controlling the amount of said lost motion and secondary controlling means arranged to replace said device at controllably selected times in the movement of the conveyer.

33. A machine for making wirebound boxes by the action of coöperating stapling and binding wire supplying means on box blank material comprising feeding means for the material including an oscillating driver for said feeding means adapted to feed the material on movement in one direction and having a fixed extreme position, a stop normally to determine its other extreme position and means effective in controllable correlation with the movement of said conveyer for positioning said driver independently of said stop.

34. Feeding mechanism for wire box machines comprising a work-feeding member, a ratchet wheel, a pawl arm and pawl arranged to operate said wheel intermittently, means for operating said arm, a slidable block connected to reciprocate with said arm, a pawl on said block, a movable stop member arranged to limit the inoperative movement of said block, and a member on said work-feeding member arranged to move said stop member into inoperative position.

35. A machine for use in making wire bound boxes comprising, in combination, means including fastener-setting mechanism for applying binding wire to box sections; means to cause relative progression between the work and said mechanism; means normally controlling the progression for normal spacing of fasteners; and automatic means controlling the progression for definitely positioning fasteners in desired relation to the work.

36. A machine for use in making wire bound boxes comprising, in combination, means including fastener-setting mechanism for applying binding wire to box sections; means to cause relative progression between the work and said mechanism; automatic fastener-positioning mechanism comprising successively - presented members correlated with relative positions of the work and fastener-setting mechanism and means whereby said members control the progression for definitely positioning fasteners; and means, adapted to be temporarily incapacitated by said members, normally controlling the progression.

37. A machine for use in making wire bound boxes by the action of binding wire applying and fastener-setting mechanism upon assembled box parts, comprising, in combination with said mechanism, means for progressively subjecting thereto successive assemblies of box parts, the machine being continuously operative upon successive assemblies for a plurality of boxes; automatic fastener positioning means controlling relative movements between the work and fastener-setting mechanism for definitely locating individual fasteners upon successive assemblies; and means normally controlling relative movements for spacing other fasteners.

38. A machine for use in making wire bound boxes by the action of binding wire applying and fastener-setting mechanism upon assembled box parts, comprising, in combination with said mechanism, means for progressively subjecting to its action successive box sections; means controlling relative movements between the work and fastener-setting mechanism for definitely locating individual fasteners in relation to the adjacent edges of the box sections; and means normally controlling relative movements for spacing intermediate fasteners.

39. A machine for use in making wire bound boxes comprising, in combination, fastener-setting mechanism for securing binding wire to box section at intervals; step-feed mechanism producing such intervals; mechanism for regulating the feed; means normally controlling said mechanism to determine uniform feed steps; and means automatically controlling said mechanism to vary the feed.

40. A machine of the class described comprising, in combination, binding wire applying and fastener-setting mechanism and coöperating means for presenting box sections in assembled relation progressively to said mechanism; and mechanism to determine relative step movements; means normally controlling the same to determine uniform feed steps; and automatically substituting control means to determine certain feed steps to locate fasteners relative to the work.

41. A machine for use in making wire bound boxes comprising, in combination, coöperating binding wire supplying, fastener-setting, and work-feeding mechanisms for securing binding wire at intervals to successive box sections; and separate feed controls, one normally effecting uniform feed steps, the other automatically operating to effect controllably selected feed steps to locate fasteners relative to said box sections.

42. A machine for use in making wire bound boxes comprising, in combination, binding wire applying and fastener-setting mechanism, work-supporting means, feed mechanism to cause relative step-by-step movement between the work and fastener-setting mechanism, separate feed controls, one normally effecting uniform feed steps, the other automatically operating periodically to produce a skip feed in a plurality of steps to prevent fastener-applying at joints between sections.

43. A machine for use in making wire bound boxes comprising, in combination, means including fastener-setting mechanism for securing binding wire at intervals to successive box sections, work-supporting means, step-feed mechanism whereby the work is progressively subjected to the action of said fastener-setting mechanism, and separate feed controlling means automatically effective in alternation, the action of one of said controlling members being successively correlated to the relative position of the work with respect to the fastener-setting mechanism.

44. A machine for use in making wire bound boxes comprising, in combination, means including fastener-setting mechanism to secure binding wire to box sections, work-supporting means, step-feed mechanism to cause relative movement between the work and the fastener-setting mechanism, and separate feed controls for determining different feed steps, one normally and the other at times effective, the normally effective control being automatically displaceable by the other.

45. A machine for use in making wire bound boxes by the action of binding wire applying and fastener-setting mechanism upon assembled box sections, comprising, in combination, said mechanism, work-supporting means, step-feed mechanism, normal feed control means, and auxiliary means automatically operating to change the step feed to locate fasteners at selected points.

46. A machine for use in making wire bound boxes by the action of binding wire applying and fastener-setting mechanism upon successive box sections, comprising, in combination, said mechanism, work-supporting means, step-feed mechanism, and work-controlled detector means determining feed steps to prevent fastener-applying at joints between sections, and other means normally determining feed steps.

47. A machine for use in making wire bound boxes by the action of fastener-setting mechanism to secure binding wire to box sections at intervals, comprising, in combination, said mechanism, work-supporting means, and step-feed mechanism, and feed controlling means comprising stops associated with the work for determining feed steps to locate fasteners, and other feed control means interrupting control by said first feed controlling means.

48. A machine for use in making wire bound boxes comprising, in combination, binding wire applying and fastener-setting mechanism, work-supporting means, step-feed mechanism causing relative progression between the fastener-setting mechanism and the work, stop mechanism governing the feed mechanism, and automatic means causing changes in operation of said stop mechanism.

49. A machine for use in making wire bound boxes comprising, in combination, binding wire applying and fastener-setting mechanism, work-supporting means, step-feed mechanism causing relative progression between the work and fastener-setting mechanism, a stop normally determining feed steps, and stops correlated with relative positions of the work, and fastener-setting mechanism automatically successively substituted therefor.

50. A machine for use in making wire bound boxes comprising, in combination, coöperating wiring and fastener-setting, work-supporting and step-feed mechanisms for securing binding wire at intervals to successive box sections, said step-feed mechanism having a variable stroke driver, and separate controls, one normally determining a uniform feed stroke of said driver and the other automatically changing the stroke.

51. A machine for use in making wire bound boxes comprising, in combination, coöperating wiring and fastener-setting, work-supporting and step-feed mechanisms for securing binding wire at intervals to successive box sections, said step-feed mechanism having a variably acting driver, a stop normally determining its action, and a series of selectively located stops successively substituted therefor.

52. A machine of the class described comprising, in combination, coöperating fastener-setting, work-supporting and step-feed mechanisms for securing fasteners at intervals to successive box sections, said step-feed mechanism comprising a variably acting driver, a stop normally determining its action, and a series of successively substituted stops located relative to adjacent box section edges.

53. A machine for use in making wire bound boxes comprising, in combination, means for successively feeding box sections, mechanism for securing binding wire to said sections at intervals, means movable with the work controlling feed steps to locate certain wire fasteners, and independent means normally controlling feed steps.

54. A machine for use in making wire bound boxes comprising, in combination, a conveyer for feeding box sections, mechanism to fasten binding wire to said sections at intervals, normal feed controlling means, and selectively adjustable means along the conveyer determining certain feed steps.

55. A machine for use in making wire bound boxes comprising, in combination, a carriage for feeding box sections, mechanism to fasten binding wire to said sections at intervals, carriage-controlled means to determine feed steps, and coöperating means independent of the carriage to determine other feed steps.

56. A machine for use in making wire bound boxes comprising, in combination, a carriage for feeding box sections, binding wire applying and fastener-setting mechanism operable upon the work, means to advance said carriage step-by-step, and carriage-controlled detector means to effect skipping feeds to prevent the application of fasteners in joints between sections, the normal step feeds being free of carriage control.

57. A machine for use in making wire bound boxes comprising, in combination, a carriage for feeding box sections, binding wire applying and fastener-setting mechanism operable upon the work, means to advance said carriage step-by-step, said means causing a normal step feed, and automatic means coöperating with the carriage to allow a varied feed for skipping or staple positioning.

58. A machine for use in making wire bound boxes comprising, in combination, coöperating work-supporting, binding-wire supplying and fastener-setting mechanisms to secure binding wires to successive box sections; means to cause relative progression between said fastener-setting mechanism and the work; and fastener-positioning mechanism causing submission of the work to the wire-fastening operation at selected points relative to adjacent box edges but non-effective for operation upon intermediate points of the work.

59. A machine of the class described comprising, in combination, a conveyer for feeding box sections, mechanism to fasten binding wire to said sections at intervals, conveyer-moving mechanism of variable effective operation, stop means for determining its operation, and members connected with the conveyer arranged for successive presentation to control said stop means, and a normal control means.

60. A machine of the class described comprising, in combination, fastener-setting mechanism; work-supporting means; means to cause relative progression between said fastener-setting mechanism and the work; and automatic means to locate fasteners at predetermined points comprising a stop mechanism for determining feed movements, successively presented members for controlling effective operations of said stop mechanism, and other means normally controlling said stop mechanism to determine intermediate feed movements.

61. A machine of the class described comprising, in combination, fastener-setting mechanism; work-supporting means; means to cause relative progression between said fastener-setting mechanism and the work; and automatic means to locate fasteners at predetermined points comprising a stop mechanism for determining feed movements, successively presented members arranged along the work for controlling effective operations of said stop mechanism, and other means adapted to be superseded by said successively presented members for normally determining feed steps.

62. A machine for use in making wire-bound boxes comprising, in combination, fastener-setting mechanism to secure binding wire to box parts; work-engaging means; means for producing relative movement therebetween for progressively subjecting the work to the operation of said fastener-setting mechanism; and automatic means controlled by said relative movement for cutting the wire.

63. A machine for use in making wirebound boxes comprising, in combination, relatively movable work-engaging and wire-attaching instrumentalities, and means for producing relative movement therebetween; said elements constructed and arranged to provide a continuously operating organization for wiring successive assemblies of box parts; and automatic cutting mechanism controlled by said relative movement for severing the wire between successive assemblies.

64. A machine of the class described comprising, in combination, coöperating blank-feeding and binding wire applying and fastener-setting mechanisms in a continuously operating organization for wiring successive blanks; means for spacing the blanks; a wire cutter; and means controlled by the feeding means in accordance with the passage of a blank for operating the cutter to sever the wire between blanks after its attachment to the following blank.

65. A machine for use in making wirebound boxes comprising, in combination, means including fastener-setting mechanism to secure binding wire to box parts; means for relatively moving said mechanism and box parts to apply fasteners at different points on said box parts; a wire cutter; actuating means therefor; and means in fixed relation to the work and moving therewith to control the operation of said actuating means.

66. A machine for use in making wirebound boxes comprising, in combination, means to secure binding wire to box parts; automatic means for cutting said binding wire; and controlling means for causing operation of said wire cutting means, including an element contacting with the work and means coöperable with said element to start a cutting operation when the work and said element have a desired relationship to said wire cutting means.

67. A machine for use in making wirebound boxes, comprising in combination, fastener-setting means to secure binding wire to box parts; work positioning means; means for relatively moving said securing means and said positioning means; wire cutting means normally in inactive position; and means independent of timed relationship with the fastener-setting means for bringing the wire cutting means into active position by relatively moving the wire cutting means and said positioning means into desired relationship.

68. A machine for use in making wire-bound boxes comprising, in combination, means to secure binding wire to box parts; automatic means for cutting said binding wire; and mechanism for controlling said wire cutting means including means interposed between the work and the wire cutting means to initiate a cutting operation when the work and said cutting means are in desired relationship.

69. A machine for use in making wire-bound boxes comprising, in combination, means to secure binding wire to box parts; automatic means for cutting said binding wire; mechanism, including means engaging the work, to determine a desired relationship between work and cutting means at the time of a cutting operation; and a means to determine a desired relationship between said binding wire securing means and said cutting means at the time of a cutting operation.

70. A machine for use in making wire-bound boxes comprising, in combination, means to secure binding wire to box parts; a binding wire cutter operable by said securing means when in a certain relationship thereto; and a controller operating when the work and said cutting means are in desired relationship to bring said cutter and securing means into relationship for actuation of the cutter by said securing means.

71. A machine for use in making wire-bound boxes comprising, in combination, means to secure binding wire to box parts; work positioning means; means for relatively moving said securing means and said positioning means; wire cutting means; and means for operating the wire cutting means by relatively moving the wire-cutting means and said positioning means into desired relationship; said elements constructed and arranged to provide a continuously operating organization for wiring successive assemblies of box parts and cutting the binding wire therebetween.

72. A machine for use in making wire-bound boxes comprising, in combination, means to secure binding wire to box parts; automatic means for cutting said binding wire; and mechanism for controlling said wire cutting means including means interposed between the work and the wire cutting means to initiate a cutting operation when the work and said cutting means are in desired relationship, said elements constructed and arranged to provide a continuously operating organization for wiring successive pieces of work and severing the wires therebetween.

73. A machine for use in making wire-bound boxes comprising, in combination, means to secure binding wire to box parts; means to cause relative progression between the work and securing means; said elements constructed and arranged to provide a continuously operating organization for wiring successive pieces of work and severing the wires therebetween; automatic means for cutting binding wire; mechanism, including means engaging the work, to determine a desired relationship between work and cutting means at the time of a cutting operation; and a means to determine a desired relationship between said binding wire securing means and said cutting means at the time of a cutting operation.

74. A machine for use in making wire-bound boxes comprising, in combination, means to secure binding wire to box parts; means for feeding the work; automatically-operated means for cutting said binding wire; said elements constructed and arranged to provide a continuously operating machine for wiring successive pieces of work and severing the binding wire between such pieces of work; and automatic means to determine a desired relationship between the cutting means and each of a succession of pieces of work at the time of the respective cutting operations.

75. A machine for use in making wire-bound boxes comprising, in combination, means to secure binding wire to box parts: means for cutting said binding wire; means to deliver, without stopping the operation of the machine, successive pieces of work to said cutting means; and automatic mechanism successively controlled thereby for operating said cutting means to sever the binding wire between pairs of such successively delivered pieces.

76. A machine for use in making wire-bound boxes comprising, in combination, means to secure binding wire to box parts; means to cause relative progression between the work and securing means; means for cutting said binding wire; and automatic mechanism including a movable member, 63, controlled to operate successively in definite relation to each of successively passing pieces of work, for operating said cutting means to sever the binding wire between such pieces.

77. A machine for use in making wire-bound boxes comprising, in combination, means to secure binding wire to box parts; means to cause relative progression between the work and securing means; said elements constructed and arranged to provide a continuously operating organization for wiring successive pieces of work and severing the binding wire therebetween; means for cutting said binding wire; and automatic means including trip mechanism successively controlled in accordance with the relative progression of successive pieces of work for operating said cutting means.

78. A machine for use in making wire-bound boxes comprising, in combination, means to secure binding wire to box parts; means for relatively moving the work and securing means; automatically operated means for cutting said binding wire; and means including a pivoted member adapted for successive operations in accordance with the passage of successive pieces of work for controlling the operation of said cutting means; said elements constructed and arranged to provide a continuously operating organization for wiring successive pieces of work and severing the binding wire therebetween.

79. A machine for use in making wirebound boxes comprising, in combination, means to secure binding wire to box parts; means to cause relative progression between the work and securing means; and automatic means for cutting the binding wire between successive pieces of work, including a swinging member adapted successively to move from an ineffectual to an effectual position for a cutting operation in accordance with successive presentations in desired relation to the cutting means of each of such successive pieces of work.

80. A machine for use in making wirebound boxes comprising, in combination, means to secure binding wire to box parts; means to cause relative progression between the work and securing means; a binding wire cutter; actuating means therefor; and automatic means for controlling the operation of said cutter, including a member successively controlled in accordance with the passage of successive pieces of work for moving the cutting means from an ineffectual to an effectual position for cutting.

81. A machine for use in making wirebound boxes comprising, in combination, means to secure binding wire to box parts; means to cause relative progression between the work and securing means; individual binding wire cutters; actuating means therefor; movable holders for the respective cutters normally maintaining them in an ineffectual position for a cutting operation; and means automatically controlled in accordance with the presentation of successive pieces of work for operating said holders to move the cutters to a position effectual for a cutting operation.

82. A machine for use in making wirebound boxes comprising, in combination, means to secure binding wire to box parts; a binding wire cutter; work positioning means engaging said box parts; and means for automatically operating the cutter when the work positioning means positions the work in desired relationship with the cutter, said automatic operation of the cutter dependent upon said positioning operation.

83. A machine for use in making wirebound boxes comprising, in combination, means to secure binding wire to box parts; a binding wire cutter; means to cause relative progression between the work and the wire securing means; devices for determining spacial relationship of successive pieces of work during such progression; and means automatically brought into action by such devices in coming successively into a given relationship with the cutter for operating the latter to sever the binding wire between successive pieces of work.

84. A machine for use in making wirebound boxes comprising, in combination, means to secure binding wire to box parts; a binding wire cutter; means to cause relative progression between the work; and the wire-securing means; a plurality of cutter controlling members spaced according to the distances between corresponding edges of successive pieces of work; and means controlled by said members in succession for operating the cutter.

85. A machine for use in making wirebound boxes comprising, in combination, means to secure binding wire to box parts; a binding wire cutter; means to cause relative progression between the work and the wiresecuring means; a plurality of cutter controlling devices similarly definitely related respectively with successive pieces of work; and means successively controlled by said devices for operating the cutter.

86. A machine for use in making wirebound boxes comprising, in combination, fastener applying mechanism for securing wire to box parts; a conveyer for the box parts; a spacer block on the conveyer; and wire severing means controlled by the spacer block.

87. A machine for use in making wirebound boxes comprising, in combination, binding-wire applying instrumentalities; means for progressively subjecting thereto successive assemblies of box parts; workengaging devices for determining spacial relationship of adjacent assemblies in presentation to said binding-wire applying instrumentalities; and automatic mechanism for severing the wires between adjacent assemblies, comprising a wire-cutter, operating means therefor and successively presented controlling elements for said operating means positioned relative to one another by the positioning of said work-engaging devices, whereby said mechanism is controlled to operate the cutter at proper times in accordance with the lengths of the respective assemblies.

88. A machine for use in making wirebound boxes comprising, in combination, coöperating binding-wire applying mechanism and means to cause relative progression between the same and the work; and automatic wire-cutting mechanism controlled in accordance with the passage of the work to sever the binding wire between successive work assemblies; said cutting mechanism comprising a plurality of sets of coacting shear blades for individual wires, means holding said shear blades normally out of cutting relation with the respective wires and operable under control in accordance with the passage of the work to move the shear blades into cutting relation with the respective wires, and means for operating said shear blades to close upon and cut the wires when in such relation thereto.

89. A machine of the class described comprising, in combination, means including fastener-setting mechanism for applying binding wire to box-forming materials; a reciprocating cross-head for actuating said fastener-setting mechanism; a work-support; means for relatively moving the work and fastener-setting mechanism for progressive submission of the work to the fastener-setting mechanism; and automatic cutting mechanism controlled in accordance with the passage of the work to sever the binding wires between successive pieces of work; said cutting mechanism constructed and arranged to be brought into coöperative relation with said cross-head for actuation thereby.

90. A machine for use in making wire-bound boxes comprising, in combination, binding-wire applying means including fastener-setting mechanism and actuating means therefor; a work-support for box-forming material; means for relatively moving the work and fastener-setting mechanism; and automatic means to sever the binding-wire between successive pieces of work, comprising normally disorganized mechanisms including coacting shear blades for individual wires normally held out of cutting relation therewith and means controlled in accordance with the passage of the work for organizing said mechanisms for cutting action in correlation with said fastener-setting actuating means for actuation thereby.

91. A machine for use in making wire-bound boxes comprising, in combination, binding-wire applying means; means to cause relative progression between the work and binding-wire applying means; and automatic means controlled in accordance with the progress of the work to sever the binding wires between successive pieces of work, said means comprising a plurality of sets of coacting shear blades normally maintained out of cutting position and adapted to move into position over, close upon and cut individual wires.

92. A machine for use in making wire-bound boxes comprising, in combination, binding-wire applying means including fastener-setting mechanism and actuating means therefor; means to cause relative progression between the work and fastener-setting mechanism; and automatic means to sever the binding wires between successive work assemblies, comprising individual wire cutters arranged for actuation by said fastener-setting actuating means together with means normally maintaining them out of action and controlled in accordance with the progress of the work for bringing them into action.

93. A machine for use in making wire-bound boxes comprising, in combination, binding-wire applying means including fastener-setting mechanism and actuating means therefor; means to cause relative progression between the work and fastener-setting mechanism; and automatic binding wire cutting mechanism arranged for actuation by said fastener-setting actuating means, said cutting mechanism constructed and arranged to remain normally out of cutting action and including means controlled in accordance with the passage of the work for bringing the same into action to sever the binding wires between successive work-assemblies.

94. A machine for use in making wire-bound boxes comprising, in combination, relatively movable work-engaging and wire-attaching instrumentalities, and means for producing relative movement therebetween; said elements constructed and arranged to provide a continuously operating organization for wiring successive assemblies of box parts for a plurality of boxes; and automatic mechanism controlled by said relative movement for severing the binding wires between successive assemblies; said mechanism including a plurality of pairs of coacting shear blades normally removed from and adapted to close over and cut individual binding wires.

95. A machine for use in making wire-bound boxes comprising, in combination, binding-wire applying means including fastener-setting mechanism and a reciprocating actuator therefor; a work-support; means for relatively moving the work and fastener-setting mechanism; said elements constructed and arranged to provide a continuously operating organization for wiring successive blanks; and automatic means to sever the binding wire between blanks, comprising cutting mechanism arranged for operation by said actuator, said cutting mechanism normally in inoperative condition and having means rendered effective on the passage of a blank for rendering the same operative for the cutting action.

96. A machine for use in making wire-bound boxes comprising, in combination, means to secure binding wire to box parts; means to cause relative progression between the work and wire-securing means; and automatic means for cutting the binding wire between successive pieces of work, including a member adapted successively to move from an ineffectual to an effectual position for a cutting operation in accordance with successive presentations in desired relation to the cutting means of each of such successive pieces of work.

97. A machine for use in making wirebound boxes comprising, in combination, means to secure binding wire to box parts; means to cause relative progression between the work and wire-securing means; individual binding wire cutters; movable holders therefor normally maintaining them in an ineffectual position for a cutting operation, and controlled in accordance with the passage of successive pieces of work to move the cutters to a position effectual for a cutting operation; and automatic means for actuating the cutters when so effectually positioned.

98. In a box blank machine, the combination of devices to form spaces at intervals in the materials; mechanism to fasten binding wire to the materials; a device for cutting said wire; and means controlled in accordance with said previously formed spaces periodically to control said wire-cutting device.

99. A machine for use in making wirebound boxes adapted for continuous operation on a succession of assemblies of box parts comprising, in combination, means for securing binding wire to box parts, means to cause relative progression between the box parts and said securing means, means for spacing said assemblies of box parts, and means for cutting said wire upon the passage of a space opposite said cutting means.

100. A machine of the class described comprising, in combination, means to secure binding wire to box parts; means to cause relative progression between successive assemblies of box parts and the wire-securing means; means for spacing said assemblies; and automatic means controlled in accordance with said relative progression for cutting the binding wire in spaces between assemblies, including a controller therefor operating upon presentation of a space.

101. A machine for use in making wirebound boxes comprising, in combination, means for securing binding wire to box parts, means to cause relative movement between the work and securing means; means for cutting said wire; means engaging the work for determining the point of cut-off; and actuating means for said cutting means controlled by said work-engaging means.

102. A machine for use in making wirebound boxes comprising, in combination, means to secure binding wire to box parts; automatic means for cutting said binding wire; and means in fixed relation to said box parts and moving therewith to control the operation of said cutting means.

103. A machine for stapling suitably prepared materials to form blanks for the sides of boxes or crates, comprising an endless traveling work-holder, means for wiring the blanks, mechanism for cutting the blanks apart, and means governed by the traveling movement of said work-holder for automatically controlling said cutting mechanism.

104. A machine for use in making wirebound boxes comprising, in combination, fastener-setting mechanism to secure binding wire to box sections; means to cause relative progression between the work and fastener-setting mechanism; automatic means determining a desired relationship between the work and fastener-setting mechanism at the time of application of an individual fastener for definitely positioning the same in desired relation to an edge of a box section; and means normally controlling the progression for normal spacing of fasteners.

105. A machine for use in making wirebound boxes comprising, in combination, fastener-setting mechanism to secure binding wire to box sections; means to cause relative progression between the work and fastener-setting mechanism; automatic means, including a controlling member fixed in reference to a desired fastener-receiving point on the work, for controlling an interval of progression between consecutive fastener-setting operations to locate a particular fastener; and means normally controlling the progression for normal fastener spacing.

106. In a machine of the class described having fastener-setting mechanism to secure binding wire to box material progressively subjected to the operation thereof, means to cause relative progression between the work and fastener-setting mechanism in intervals of controlled length between consecutive fastener-setting operations, including a driver, actuating means therefor, and normal and supplemental controlling means, one automatically superseding the other in action, said driver controllable in effective action by each of said controlling means at different times, said driver and normal means coöperating to cause desired intervals of progression for normal fastener-spacing, and said driver and supplemental means coöperating to cause an independently determined interval of progression.

107. In a machine of the class described having fastener-setting mechanism to secure binding wire to box material progressively subjected to the operation thereof, means to cause relative progression between the work and fastener-setting mechanism in intervals of controlled length between consecutive fastener-setting operations, comprising a train of motion-producing devices having provision for variable lost motion and normal and supplemental means for differently controlling such lost motion for different intervals of progression, one such controlling means automatically superseding the other in action.

108. A machine of the class described comprising, in combination, fastener-setting mechanism; work-supporting means; mechanism to cause step-by-step relative movements between the work and fastener-setting mechanism, including a variably coactive pawl and ratchet; a stop normally controlling the coaction of the said pawl and ratchet for normal spacing of fasteners on the work; and automatically substituted stops to control such coaction for regulating certain step movements.

109. A machine of the class described comprising, in combination, fastener-setting mechanism; work conveying means; mechanism susceptible of variably effective operation for driving the work-conveying means; a normal controlling means for said last named mechanism determining work-feeding intervals between consecutive fastener-setting operations; and controlling members arranged longitudinally of the work-conveying means and moving therewith and automatically successively substituted for said normal controlling means.

In testimony whereof I have signed my name to this specification in the presence of two subscribing witnesses.

SERAPHINE F. BAUWENS.

Witnesses:
JOSHUA R. H. POTTS,
BRAYTON G. RICHARDS.